Dec. 29, 1931.  E. DICKEY  1,838,216
ENGINE
Filed June 23, 1930
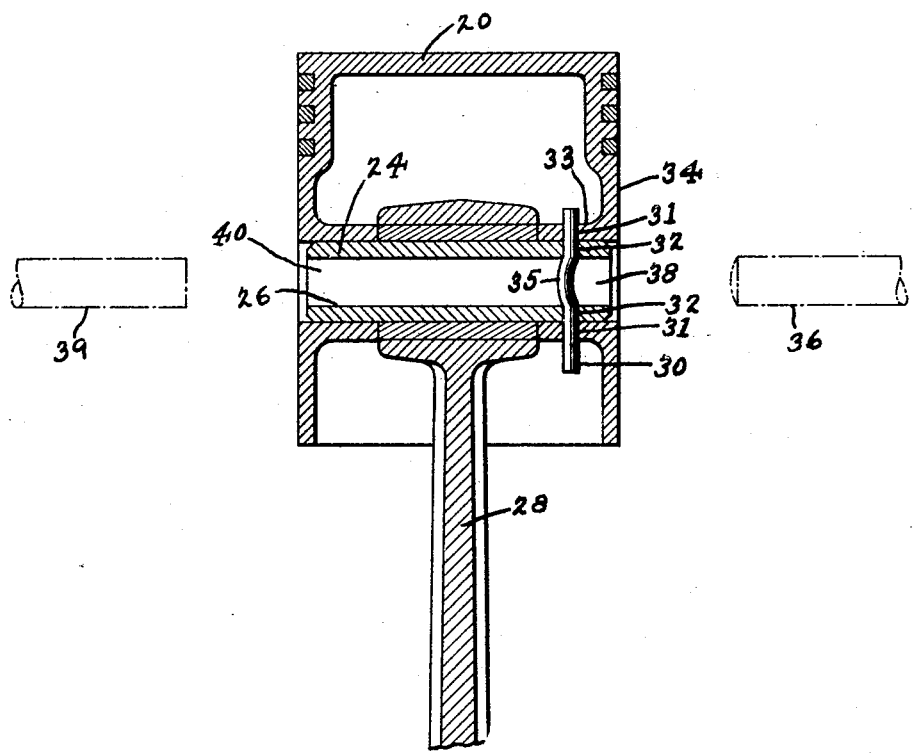
INVENTOR
Ernest Dickey
BY
Spencer, Hardman and Fehr
ATTORNEY Patented Dec. 29, 1931

1,838,216

UNITED STATES PATENT OFFICE

ERNEST DICKEY, OF DAYTON, OHIO, ASSIGNOR TO DELCO-LIGHT COMPANY, OF ROCHESTER, NEW YORK, A CORPORATION OF DELAWARE

ENGINE

Application filed June 23, 1930. Serial No. 463,175.

This invention relates to pistons for internal combustion engines or the like and more particularly to means for locking a piston pin in a piston.

An object of this invention is to provide improved means for locking a hollow cylindrical member such as a piston pin in a structure having a bore such as a piston, which means may be readily and easily removed.

Further objects and advantages of the present invention will be apparent from the following description, reference being had to the accompanying drawing, wherein a preferred form of the present invention is clearly shown.

In the drawing:

The figure in the drawing is a vertical view in cross section of a piston, and showing the locking means embodying features of my invention.

Referring to the drawing the numeral 20 designates in general a piston adapted for use in an internal combustion engine, compressor or the like. The piston 20 is provided with a piston pin 24 having a bore 26. The piston 20 is adapted to be actuated by a connecting rod 28 which is connected on the one end to the piston pin 24 and on its other end to the usual crank or eccentric not shown.

In accordance with this invention I provide locking means for locking the piston pin in position in the piston. The locking means comprises a pin 30 inserted in aligned apertures 31 and 32 in a boss 33 on the skirt 34 of piston 20 and in the piston pin respectively. As shown in the drawing the pin 30 is deformed at 35 within the bore 26 of the piston pin 24. Thus in order to lock the piston pin within the piston all that is necessary is to insert the pin 30 in the aligned apertures 31 and 32 and then insert any suitable blunted instrument, such as shown in dot and dash lines at 36, into the open end 38 of the piston pin to deform the pin 30 in the manner illustrated in the drawing. Thus it will be noted that the pin 30 is locked in position to thereby lock the piston pin the piston. In order to remove the pin 30 all that is necessary is to insert any suitable instrument, such as shown in dot and dash lines at 39, into the open end 40 of the piston pin 24 to again straighten the pin 30 or to shear off said pin. By this arrangement the pin 30 readily locks the piston pin in the piston and said deformed pin can be readily and easily removed.

While the form of embodiment of the invention as herein disclosed constitutes a preferred form, it is to be understood that other forms might be adopted, all coming within the scope of the claims which follow.

What is claimed is as follows:

1. In a piston, the combination with a piston pin having a bore extending throughout its length and a pin extending transversely through said piston pin and through aligned apertures in said piston and being deformed within said bore.

2. In a piston, the combination with a piston pin having a bore extending throughout its length, and a straight pin extending transversely through said bore and through aligned apertures in said piston, said bore being adapted to receive tools for bending and for removing said straight pin.

3. In a piston, the combination with a piston pin having a bore, and a pin extending transversely through said piston pin and into aligned apertures in said piston and being deformed within said bore.

4. In a piston, the combination of a structure having a bore, a hollow cylindrical member fitted within the bore, said cylindrical member and the opposite walls of the structure engaging said member having aligned apertures arranged transversely of the bore, and a locking pin extending through and across the hollow cylindrical member and within the apertures of said structure and deformed within the hollow of said cylindrical member.

In testimony whereof I hereto affix my signature.

ERNEST DICKEY.